(12) United States Patent
Dasari et al.

(10) Patent No.: US 9,223,821 B2
(45) Date of Patent: Dec. 29, 2015

(54) DATA BACKUP PRIORITIZATION

(75) Inventors: Rajashekar Dasari, Hyderabad Andhra Pradesh (IN); Hari Dhanalakoti, Hyderabad A P (IN); Ganesh Kolli, Hyderabad AP (IN); Srinivas Sanapala, Hyderabad AP (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 212 days.

(21) Appl. No.: 14/006,002

(22) PCT Filed: Mar. 21, 2011

(86) PCT No.: PCT/IN2011/000182
§ 371 (c)(1),
(2), (4) Date: Sep. 18, 2013

(87) PCT Pub. No.: WO2012/127476
PCT Pub. Date: Sep. 27, 2012

(65) Prior Publication Data
US 2014/0052694 A1    Feb. 20, 2014

(51) Int. Cl.
*G06F 17/30* (2006.01)
*G06F 11/14* (2006.01)

(52) U.S. Cl.
CPC ...... *G06F 17/30345* (2013.01); *G06F 11/1461* (2013.01)

(58) Field of Classification Search
CPC ................ G06F 17/30345; G06F 11/1461
USPC .................................................. 707/640–673
See application file for complete search history.

(56) References Cited

U.S. PATENT DOCUMENTS

| 7,930,559 | B1 * | 4/2011 | Beaverson et al. ........... 713/193 |
| 2002/0019827 | A1 * | 2/2002 | Shiman et al. ................ 707/200 |
| 2008/0154979 | A1 | 6/2008 | Saitoh et al. |
| 2009/0300633 | A1 | 12/2009 | Altrichter et al. |

FOREIGN PATENT DOCUMENTS

| CN | 1877534 A | 12/2006 |
| CN | 101339521 A | 1/2009 |
| EP | 0899662 A1 | 3/1999 |
| JP | 2010225021 A | 10/2010 |

OTHER PUBLICATIONS

The State Intellectual Property Office, P.R.China, International Search Report and Written Opinion, Dec. 29, 2011, 13 pages, Beijing, China.
European Patent Office, Extended EP Search Report, Aug. 18, 2014, 12 pages, Munich, Germany.

* cited by examiner

*Primary Examiner* — Hares Jami
(74) *Attorney, Agent, or Firm* — Hewlett Packard Enterprise Patent Dept.

(57) ABSTRACT

A method for prioritizing data backup requests includes assigning priority values to a plurality of parameters, each parameter being associated with a plurality of data backup requests. The data backup requests can be sorted according to a primary parameter based on the priority values to prioritize the data backup requests. The data backup requests can also be sorted according to a secondary parameter when at least two of the data backup requests have a same primary parameter priority value.

14 Claims, 6 Drawing Sheets

DATA BACKUP PRIORITIZATION

BACKGROUND

In IT (information technology) environments, backup administrators are often placed, in charge of performing data backups. Backup administrators often perform multiple roles, such as being a backup operator as well as a backup administrator for carrying out daily tasks. Some example backup tasks may include: ensuring that backup policies and/or jobs are created successfully, ensuring that scheduled backups are completed, ensuring that tapes are managed, and so forth.

Backup administrators often rely on users of a system or application to understand the complexity and business criticality for backup job prioritization. However, there is sometimes a disconnect between IT administrators and the business management. For example, some business managers may feel that a particular set of data is very important and request high prioritization, when in reality there may exist other backup jobs of higher importance. With the disconnect, backup job prioritizations may go unchallenged. This can lead to improper prioritization of backup jobs, which in turn can cause important backup jobs to be relegated to a lesser priority and later backup time in a backup administrator's task list.

In IT departments and datacenters, backup reporting tools can report on the successes and failures of backup jobs. There lies a challenge to perform root-cause analysis and improve the perceived reliability of backup jobs while also attempting to create and edit backup jobs on a regular basis, including the prioritization and prioritization of backup jobs on an administrator's task list. Some methods of prioritizing backup jobs, which often range into hundreds of jobs, can be very inefficient, inaccurate, time consuming, and mundane. Without an adequate backup plan, a business may be at risk. Because companies rely on data and mission-critical applications, the cost of missing a backup window for important backup jobs and losing data is high. Costs for missed backups can exceed many thousands of dollars in loss of data, loss of productivity, and loss of customers.

DETAILED DESCRIPTION

Figure 1:
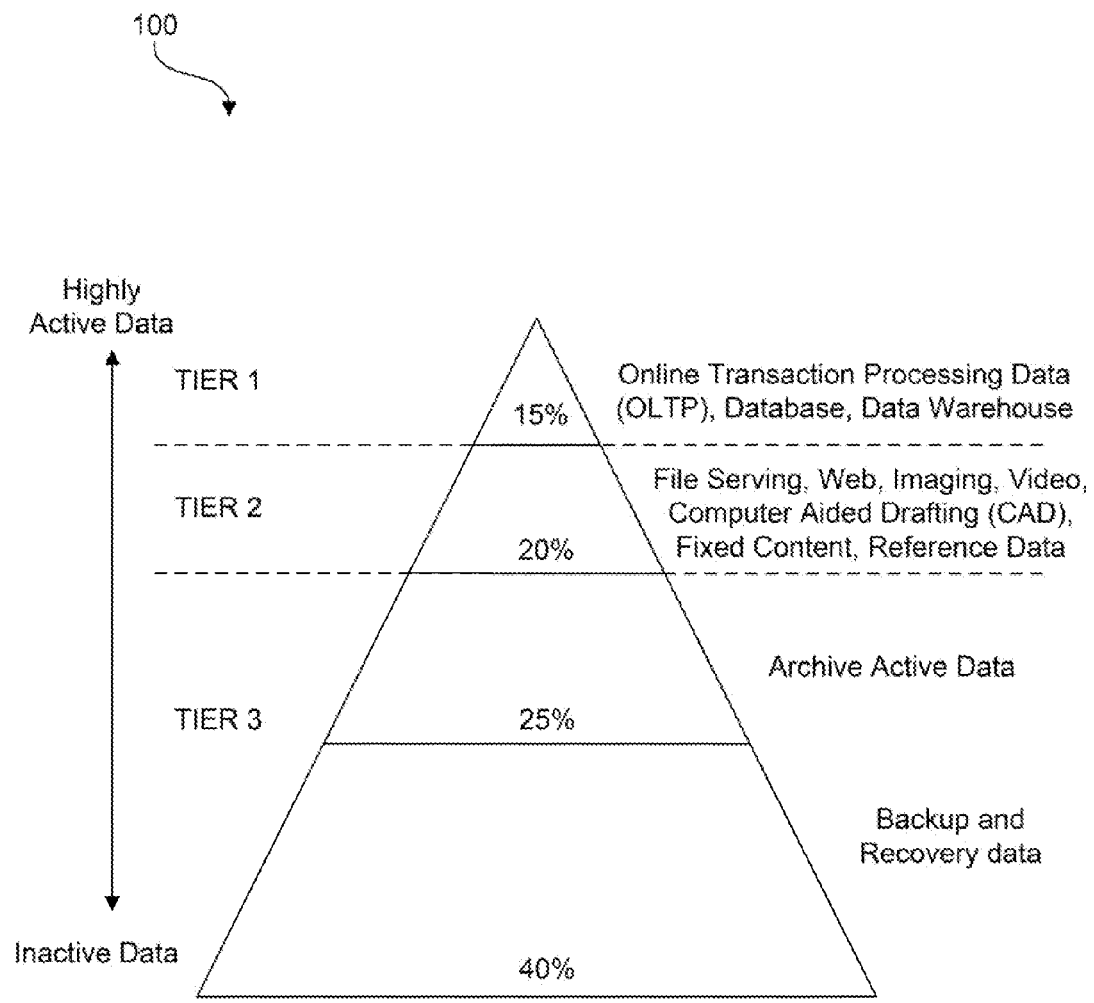
FIG. 1 is a diagram of data distribution into tiers in accordance with an example of the present technology.

Reference will now be made to the examples illustrated, and specific language will be used herein to describe the same. It will nevertheless be understood that, no limitation, of the scope of the technology is thereby intended. Additional features and advantages of the technology will be apparent from the detailed description which follows, taken in conjunction with the accompanying drawings, which together illustrate, by way of example, features of the technology.

Customers across many industries and business segments are looking for ways to effectively prioritize backup jobs while increasing quality and agility in their backup administration role. In IT departments or datacenters, backup administrators may have hundreds of data backup job requests from various departments. Bach requestor may indicate that a particular backup job is important and request that the backup job be prioritized/re-prioritized above other requests and/or be performed immediately. From a perspective of an individual requestor, the backup job may be important, but from a backup administrator's perspective there may be more important backup job requests to address. The backup administrator typically may attempt to manage new and existing backup job requests based, on importance to the business or organization and further attempt to accurately prioritize these backup jobs such that backup jobs are created/scheduled relative to an importance and/or criticality of the data.

The present technology provides for management, organization, and prioritization of data backup jobs. Due to a potentially large number of data backup requests combined with the complexities of many computing systems, data centers, and the like, old/existing backup jobs may not be getting completed due to various reasons (short backup window, media not available, schedule slippage) and may never receive an appropriate priority. In some instances, a backup administrator may not be able to understand the backup job's application, complexity.

A backup policy visualization, organization, or management tool can be used to identify priority data from the backup request task list. The tool can also enable a backup administrator to identify vulnerable data in the datacenter and resolve problems associated with backup job scheduling using a multi-criteria decision method.

An example method for prioritizing data backup requests can include assigning priority values to a plurality of parameters, each parameter being associated with a plurality of data backup requests. The data backup requests can be sorted according to a primary parameter based on the priority values to prioritize the data backup requests. The data backup requests can also be sorted, according to a secondary parameter when at least two of the data backup requests have a same primary parameter priority value.

Further details about the systems, methods, tools, and so forth can be understood according to the following discussion. Referring to Table 1 below, an example will be described in which a backup administrator has list of backup job requests. In this example, the list totals twenty backup job requests, which includes both new and old jobs. The administrator may be tasked with scheduling/rescheduling the data backups. Prior methods for performing data backup have typically included listing the newest jobs at the top of the list, as shown in Table 1. An administrator may often lack the experience, or understanding of the application or system context from which the backup of data is being performed. As a result, factors shown in Table 1 such as storage tiers, path analysis, redundancy and so forth may not be known or considered in scheduling, organization, prioritization, and so forth. Since new backup job requests are listed at the top and old/existing jobs are relegated thereunder, an important backup job may be delayed indefinitely until and unless a requestor explicitly requests for a higher priority. The important, yet older backup job requests may be treated as any of the other existing backup jobs to be scheduled.

TABLE 1

| Backup Jobs | Job State (New Job, NJ/ Old Job OJ) | Storage Tiers (ST) | MPIO (MP) | Type of Redundancy (RA) |
|---|---|---|---|---|
| J1 | NJ | T1 | 8 | RAID-5 |
| J2 | NJ | T3 | 8 | RAID-10 |
| J3 | NJ | T2 | 4 | MIRROR |
| J4 | NJ | T3 | 4 | STRIPE |
| J5 | NJ | T1 | 16 | STRIPE |
| J6 | NJ | T3 | 6 | CONCAT |
| J7 | NJ | T1 | 8 | RAID-5 |
| J8 | NJ | T3 | 2 | RAID-5 |
| J9 | NJ | T2 | 4 | MIRROR |
| J10 | NJ | T1 | 4 | RAID-6 |
| J11 | OJ | T2 | 8 | RAID-10 |
| J12 | OJ | T3 | 2 | MIRROR |
| J13 | OJ | T2 | 6 | RAID-6 |
| J14 | OJ | T2 | 10 | RAID-01 |
| J15 | OJ | T1 | 8 | RAID-10 |
| J16 | OJ | T1 | 6 | CONCAT |
| J17 | OJ | T2 | 10 | RAID-5 |
| J18 | OJ | T3 | 2 | CONCAT |
| J19 | OJ | T2 | 10 | RAID-6 |
| J20 | OJ | T1 | 12 | MIRROR |

In the example described above and illustrated in Table 1, an administrator may have difficulty in correctly and accurately managing and prioritizing backup requests. Because a requestor may not have sufficient knowledge to understand data importance as compared with other data and the administrator may lack the time, skills, tools, understanding, and experience to correct errors, scheduling and backup priority errors can occur. As a result, a backup policy manager or system can be used which, identifies various parameters related to a data backup request and organizes the requests according to priority values assigned to the parameters.

The following criteria are some example parameters which may be used for backup policy decision making: storage tiers (ST), multi-path input/output (MPIO or MP), type of redundancy (RD), and job priority (IP).

Reference will now be made to FIG. 1. Tiered storage can be used in assigning different categories of data to different types of storage media in order to reduce a total or overall storage cost. Tier categories may be based on levels of data protection, performance standards, frequency of use, and other considerations. Assigning data to particular media may be an ongoing and complex activity. As a result, a backup management system, can be used for managing the process of assigning a desired media for a backup job based on a company-defined policy relating to data being backed up.

FIG. 1 illustrates an example of a tiered storage policy. In this example, Tier 1 data (such as mission-critical recently accessed, or top secret files) can be stored on expensive and high-quality media such as double-parity RAIDs (Redundant Array of Independent Disks). Tier 2 data (such as financial, seldom-used, or classified files) can be stored on less expensive media in conventional storage area networks (SANs). In this example, as the tier number increases, the enterprise policy may be that cheaper media can be used. Thus, Tier 3 in a 3-tier system may contain event-driven, rarely used, or unclassified files on recordable compact discs (CD-Rs) or tapes.

After a backup administrator is provided with a request to back up a directory, drive, or application, a backup management tool can identify a storage tier of the LUN (logical unit number) of the directory, drive, or application which is to be backed up. As will be described in further detail below, a system with backup requests for data organized according to a tiered structure can prioritize the backup requests according to data importance as defined by the tier.

Figure 2:
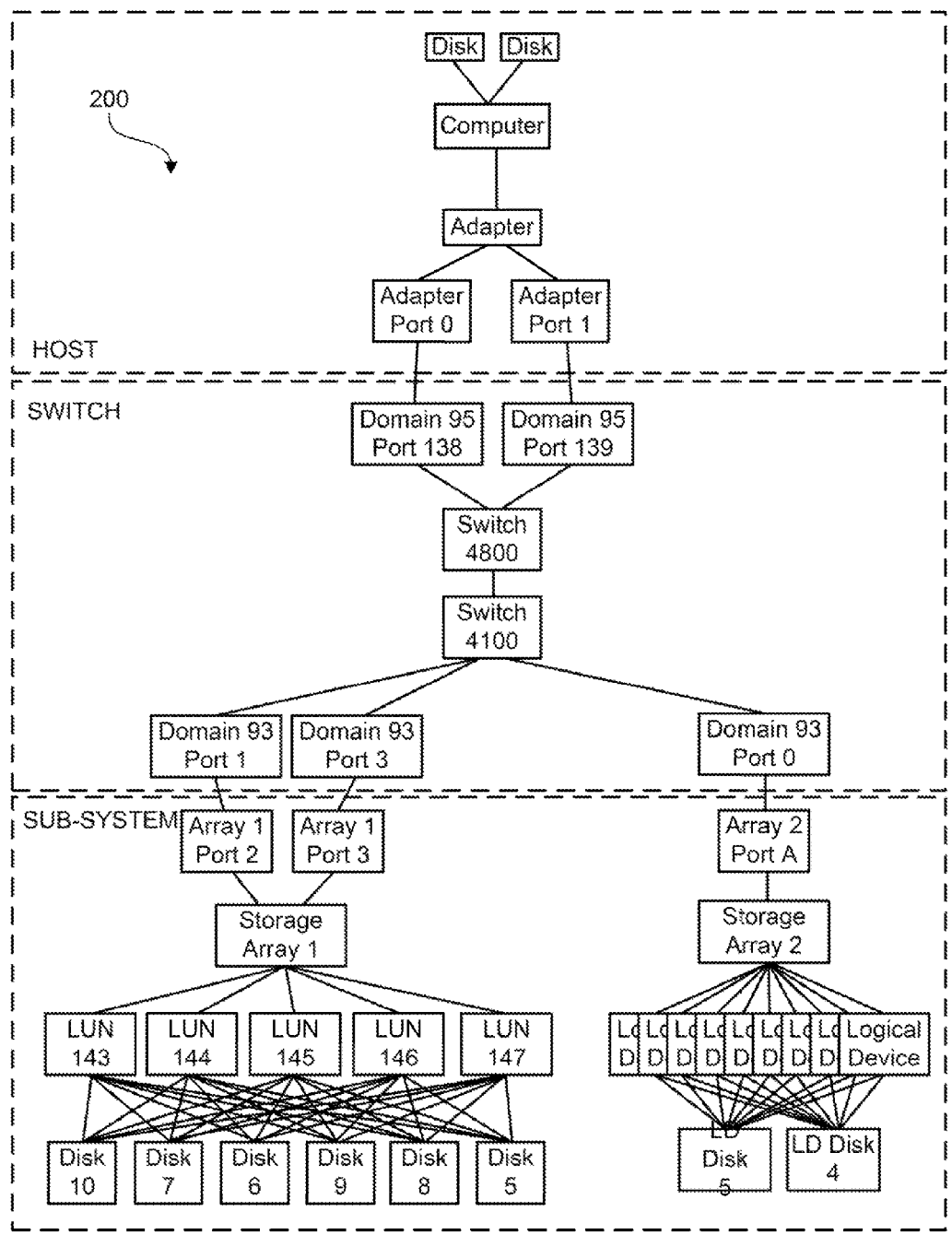
FIG. 2 is a block diagram of a multi-path computing environment in accordance with an example of the present technology.

Reference will now be made to FIG. 2. In computer storage, multipath I/O (MPIO) can be a fault-tolerance and performance enhancement technique used where there is more than one physical path between the LUN in a host and storage devices of the LUN through various controllers, fabrics, and switches connecting the LUN and storage devices. Example MPIO environments may include a SCSI (Small Computer System Interface) disk connected to two SCSI controllers on a same computer, or a disk connected to two fiber channel ports, if one controller, port or switch tails, an operating system can route I/O through the remaining controller transparently to the application with no changes being visible to applications, other than a potentially incremental latency. Multipath layers can leverage path redundancies to provide performance enhancing features, such as dynamic load balancing, traffic shaping, automatic path management, and dynamic reconfiguration.

The backup management tool can be used to perform a multipath analysis on the data to be backed up to identify a number of paths or the redundancy of paths for the data being backed up. In many systems, more paths are used where data is more important and/or more vulnerable, Use of fewer paths can be less expensive and resource-intensive, but may also leave data at greater risk of loss.

Referring to FIG. 2, a data system 200 is shown including a host 210, a switch 215, and a sub-system 220, including multiple devices, adapters, domains, and so forth. Many paths between devices are duplicated for redundancy. As can be seen in the figure, the greatest path redundancy in this example is between a LUN 225 and various disk drives 230 to ensure consistency of data availability. The backup management tool can identify multiple paths of the LUN which is to be backed up, either by referring to a database in which a number of paths for each LUN or other device is stored in association with the LUN or other device, or by analyzing the available paths for the LUN or other device.

Reference will now be made to Table 2 below, RAID is a technology that can enable high levels of storage reliability from low-cost and less reliable PC-class disk-drive components by arranging the devices into arrays for redundancy. RAID is often used in data storage schemes in which data is divided and replicated among multiple hard disk drives. The different schemes/architectures are typically named by the word RAID followed by a number, such as RAID 0, RAID 1, etc. RAID designs typically involve multiple goals. For example, some RAID goals may be to increase data reliability and/or increase input/output performance. When multiple physical disks are set up to use RAID technology, the disks are said to be in a RAID array. This array can distribute data across multiple disks, but the array is seen by the computer user and operating system as a single disk. Different RAID configurations can serve different purposes. Different RAID configurations can provide different types or levels of redundancy of data backup.

Table 2 illustrates some example RAID configurations.

TABLE 2

| RAID Level | Description | Number of Drives Supported | Capacity | Redundancy |
|---|---|---|---|---|
| 0 | Striping | 2-36 physical drives | N | No |
| 1 | Mirroring | 2 physical drives | N/2 | Yes |

TABLE 2-continued

| RAID Level | Description | Number of Drives Supported | Capacity | Redundancy |
|---|---|---|---|---|
| 1 + 0 | Mirroring and Striping | 4-36 physical drives (even number of drives) | N/2 | Yes |
| 3 | Striping with Dedicated Parity | 3-31 physical drives | N − 1 | Yes |
| 5 | Striping with Distributed Parity | 3-31 physical drives | N − 1 | Yes |
| 6 | Striping with Distributed Parity | 4-31 physical drives | N − 2 | Yes |

Another configuration not included in Table 2 is a concatenation. A concatenation (also abbreviated as "concat" herein) is sometimes referred to as a "simple" RAID. Although a concatenation of disks (sometimes called JBOD, or "Just a Bunch of Disks") is not one of the numbered RAID levels, concatenation is a popular method for combining multiple physical disk drives into a single virtual drive. The type of RAIDs described herein are provided for exemplary purposes and not as an exhaustive list of RAID types. Various other types of RAIDs may also be used and are considered within the scope of this disclosure.

The backup management tool can be used to identify a redundancy of data backup. For example, the redundancy can be identified according to a RAID level or type. The redundancy can be identified in terms of redundancy of data backup, in terms of redundancy of the data to be backed up, or both. In one example, the redundancy can be identified and ordered according to the RAID level. For instance, a RAID-6 may receive a higher priority than a RAID-5 which may receive higher priority than a RAID-3, and so forth. A concatenation would receive lower priority than, a RAID-0.

In addition to considering redundancy, path number, and storage tier, backup administrators often receive requests for scheduling backup jobs including user requests for priority, which requests for priority may be based on departmental priorities. Such user priority requests are referred to herein as "job priority". Typically some jobs will not have a job priority.

A job priority can be input to the backup management tool when the backup job is entered, or may be assigned to an existing backup job. Job priorities can include simple designations, such as "priority" or "no priority". More discerning priorities can also be used, such as numbering the priorities according to a range of importance, where lower numbers indicate a higher priority and higher numbers indicate a lower priority.

When a backup administrator is provided with a directory, drive, application, etc. to back up, the backup management tool can request various inputs from the backup administrator. For example, the administrator may be asked to input:

1) Backup Job request (e.g., directory/drive, etc.) for existing or new jobs;
2) Backup Client host name/IP (internet protocol) address; and
3) Job Priority (if available or desired).

Based on an organization's datacenter design, the backup administrator can assign, priority to the various parameters being considered with the backup requests. Example parameters include the four criteria described above, including storage tier, MPIO, type of redundancy, and job priority. If an available criteria or parameter for a backup request does not fall into an organizational datacenter design, such a parameter may be disregarded and the administrator can forgo provision of a priority for the parameter. Typically, however, the backup management tool can identify those parameters which have been designated as useful in organizing backup requests and enable the administrator to prioritize backup requests based on the useful parameters.

Table 3 below illustrates an example prioritization of various criteria considered for backup request organization. As has been described, a backup requester may not fully understand importance of the data which is the subject of the backup request as compared with other data to be backed up. However, an analysis of the criteria other than job priority in this example typically can better identify relative importance of backup requests. As such, job priority in this example has been assigned as a least priority (P3) for decision making, if a job priority is not assigned to a backup request, job priority may not be considered in decision making.

TABLE 3

| Criteria | Priority |
|---|---|
| Storage Tiers (ST) | P0 |
| MPIO (MP) | P1 |
| Type of Redundancy (RD) | P2 |
| Job Priority (JP) | P3 |

As an example, if a backup administrator has not designated any priority for any of the criteria, then, based on above a rule defined by Table 3 above: ST=P0; MP=P1; RD=P2; and JP=P3, where P0 is a greatest priority and P3 is a least priority. In other words, the backup management tool can include a default prioritization scheme for use when the backup administrator has not defined a different prioritization scheme. In another example, if the backup administrator has assigned "Job Priority" as a priority without assigning priority to any other criteria, then, IP=P0 and the default rule can be used to determine that: ST=P1; MP=P2; and RD-P3.

The backup management tool can trigger scanning on backup clients on which backup jobs were requested using the default or otherwise defined prioritization rules described above. For example, the scanning can include identification of storage tiers. The backup management tool can identify storage tiers for scanned backup clients and store this information in a backup management database. In some examples, a business organization may not use storage tier classifications. In such examples, the backup management tool can still categorize backup clients into different storage tiers based on a storage system type. As an example, XP (external storage disk array) can be assigned as Tier 1, EVA (enterprise virtual array) as Tier 2, MSA (modular smart array) as Tier3, and so forth.

The backup management, tool can identify a number of paths for scanned backup client LUNs and store the path numbers in the backup management database. The backup management tool can also identify a number of fabrics to which a backup client LUN is connected. If more than one LUN of a backup client(s) includes a same number of paths, the tool can assign a higher weight or priority to the backup client LUN which is connected through more fabrics.

The backup management tool can identify the type of redundancy for the disk, and/or LUN of the scanned backup client and store the type of redundancy in the backup management database. The backup management tool can also identify whether the directory and/or drive to be backed up is a local disk or a LUN. Understanding whether the directory to be backed up is a focal disk or is located on an external storage device can be useful. If more than one disk, and/or LUN of a backup client(s) includes a same redundancy level, then the tool can assign a higher weight or priority to the backup client disk and/or LUN which is connected to external storage, as such a storage device may be more at risk to factors outside of an organization's control.

After scanning is completed, the backup management tool can use the various criteria and priorities described to prioritize or re-prioritize backup jobs (e.g., see Table 3). For example, the backup management tool may first sort the backup job list based on P0 criteria. If after sorting there are same-ranked jobs according to the P0 criteria, then sorting can be continued based on P1 criteria. If there are still same-ranked jobs after sorting by the P1 criteria, then sorting can continue based on the P2 criteria. Similarly, if same-ranked jobs still exist according to sorting by the P2 criteria, then sorting can continue by sorting according to the remaining criteria P3, If more than one backup job still has a same rank, after sorting according to the defined criteria, then the latest (i.e., most recent) backup job request can be given a higher rank or prioritization. In another example, older backup jobs can be prioritized above more recent jobs. In this manner, the backup job task list can be prioritized/re-prioritized.

The sorted list of backup jobs can be reported to backup administrator based on the sorted ranks. A result displayed to the administrator can be seen illustrated in Table 4 below.

TABLE 4

| Back-up Rank | Jobs | Job State (New Job, NJ/ Old Job OJ) | Storage Tiers (ST) | MPIO (MP) | Type of Redundancy (RA) | Job Priority (JP) |
|---|---|---|---|---|---|---|
| 1 | J5 | NJ | T1 | 16 | STRIPE | JP5 |
| 2 | J20 | OJ | T1 | 12 | MIRROR | — |
| 3 | J7 | NJ | T1 | 8 | RAID-5 | JP6 |
| 4 | J1 | NJ | T1 | 8 | RAID-5 | — |
| 5 | J15 | NJ | T1 | 8 | RAID-1 + 0 | JP1 |
| 6 | J16 | NJ | T1 | 6 | CONCAT | JP2 |
| 7 | J10 | NJ | T1 | 4 | RAID-6 | — |
| 8 | J19 | OJ | T2 | 10 | RAID-6 | JP5 |
| 9 | J17 | OJ | T2 | 10 | RAID-5 | — |
| 10 | J14 | OJ | T2 | 10 | RAID-1 | JP6 |
| 11 | J11 | OJ | T2 | 8 | RAID-1 + 0 | JP3 |
| 12 | J13 | OJ | T2 | 6 | RAID-6 | JP4 |
| 13 | J9 | NJ | T2 | 4 | MIRROR | JP2 |
| 14 | J3 | NJ | T2 | 4 | MIRROR | JP4 |
| 15 | J2 | NJ | T3 | 8 | RAID-1 + 0 | — |
| 16 | J6 | NJ | T3 | 6 | CONCAT | JP5 |
| 17 | J4 | NJ | T3 | 4 | STRIPE | JP5 |
| 18 | J8 | NJ | T3 | 2 | RAID-5 | JP3 |
| 19 | J12 | OJ | T3 | 2 | RAID-5 | JP5 |
| 20 | J18 | OJ | T3 | 2 | RAID-5 | JP5 |

The sorted data can also be exported as a report, to various existing backup solutions, such as Hewlett Packard's Data Protector (HP DP) or Symantec's NetBackup, for example.

Based on the business organization's datacenter design, a backup administrator can provide priority to the defined criteria. Example code used by a management tool for prioritizing the criteria according to the prioritization rule shown in Table 3 is as follows:

```
Setting Criteria vs Priority (Criteria[ ], Pr)
{
    If(Criteria[ ] == ST)
    {
        Bkup_Admin_Cr.ST = Pr; // Storage Tiers(ST)
    }
    Else If(Criteria[ ] == MP )
    {
        Bkup_Admin_Cr.MP = Pr; // MPIO (MP)
    }
    Else If(Criteria[ ] == RD )
    {
        Bkup_Admin_Cr.RD = Pr; // Type of Redundancy(RA)
    }
    Else(Criteria[ ] == JP )
    {
        Bkup_Admin_Cr.JP = Pr; // Job Priority (JP)
    }
}
```

Storage tiers for scanned backup clients can be identified and stored in the backup management database. Example code used by a management toot for identifying the storage tiers using the XP, EVA, and MSA storage designations described above is as follows:

```
Identification of Storage Tiers ( BkUpJobClnHost [ ] )
{
    // Retrieving Storage Tiers Classification from HP Storage Essentials
    For ( i=0; i> BkUpJobClnHost [Max] ; i++ )
    {
        If( ( StorageSystem.Model[i] == XP ) OR
            ( StorageSystem.Model[i] == High End Array ) )
        {
            BkUpJobClnHost[ ].LUN.SS.ST = T1 ;
        }
        Else If(StorageSystem.Model[i] == EVA ) OR
        ( StorageSystem.Model[i] == Mid End Array ) )
        {
            BkUpJobClnHost[ ].LUN.SS.ST = T2 ;
        }
        Else if(StorageSystem.Model[i] == MSA ) OR
        ( StorageSystem.Model[i] == Low End Array ) )
        {
            BkUpJobClnHost[ ].LUN.SS.ST = T3 ;
        }
    }
}
```

The number of paths for scanned backup client LUNs can be identified and stored in the backup management database, including the number of fabrics to which a backup client LUN is connected.

A type of redundancy for the LUN of the scanned backup client can be identified and stored in the backup management database, including designation of whether the directory or drive to be backed up is a local disk or external storage.

With the prioritization of criteria as the identification of tiers, paths, redundancy, and/or any other criteria, the backup management tool can proceed to sort the backup job requests. For example, the jobs can be sorted according to a first criteria or parameter before sorting equally ranked jobs according to a second criteria or parameter.

Figure 3:
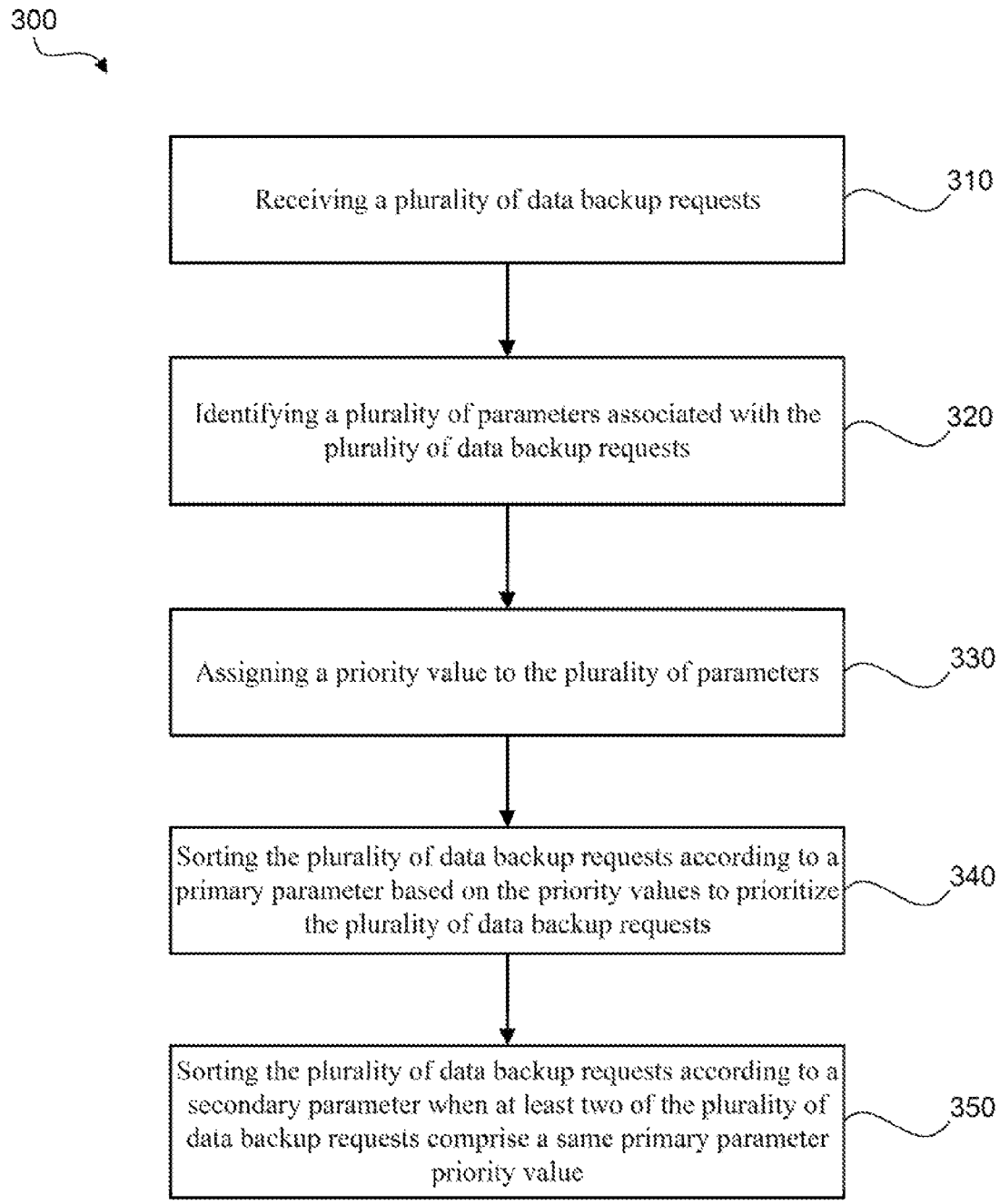
FIG. 3 is a flow diagram of a method for prioritizing data backup requests in accordance with an example of the present technology.

Referring to FIG. 3, a method 300 is shown for prioritizing data backup requests in accordance with an example. Data backup requests can be received 310 at a backup request module on a backup management server. A backup analysis module can be used, to identify 320 parameters associated with the data backup requests. Some example parameters used in the method can include storage tier assignment, number of paths in a multipath data environment, type of backup redundancy, job priority order of receipt of the data backup requests, and so forth.

A priority value can be assigned 330 to the plurality of parameters. For example, the assignment of the priority value can be the designation of a prioritization scheme or alternately the application of a prioritization scheme to the backup jobs. The data backup requests can be sorted 340 according to a primary or first parameter from the plurality of parameters based on the priority values in order to prioritize or order the data, backup requests. The data backup requests can be further sorted 350 according to a secondary parameter from the plurality of parameters when at least two of the data backup requests have a same primary parameter priority value. In other words, sorting according to subsequent parameters can proceed, when multiple data backup requests have a same priority ranking after sorting according to a current parameter.

For example, the method can further include sorting the data backup requests according to a tertiary parameter when at least two of the data backup requests have a same secondary parameter priority value. When at least, two of the data backup requests have a same tertiary parameter priority value the data backup requests can be sorted according to a quaternary parameter. When at least two of the data backup requests have a same quaternary parameter priority value the data backup requests can be sorted according to a quinary parameter.

In one aspect, the method can further include backing up data according to the sorted data backup requests. The data cart be backed up using the backup management system or can be backed up using another backup system after exporting the sorted data backup requests to a file format readable by the other backup system and storable on a non-transitory computer readable storage medium.

In one example implementation of the method, the parameters represent different levels of importance. Each of the parameters can have various different potential values corresponding to the priority values. For example, order of receipt of the data backup requests can be assigned a lowest level of importance, job priority can be assigned a greater level of importance than order of receipt of the data backup requests, type of backup redundancy can be assigned a greater level of importance than job priority, number of paths in multipath data environments can be assigned a greater level of importance than type of backup redundancy, and storage tier assignment can be assigned a greater level of importance than number of paths in multipath data, environments.

In one example, the different potential values for order of receipt of the data backup requests can include the times at which the data backup requests were received. The different potential values for job priority can include at least designations of priority or no priority, and can include more specific designations, such as a scaled ranking between a set of numbers where numbers at one end of the scale represent greater importance than numbers towards another end of the scale. The different potential values for type of backup can include designations of RAID (Redundant Array of Independent Disks) levels. The different potential values for number of paths in multipath data environments can include any values representing potential numbers of paths in the multipath data environments. The different potential values for storage tier assignment can include a various tier designations for different categories of data.

In this example, the tier designations for different categories of data can be based on importance or activity of the different categories of data, where more important or more active categories of data are assigned a higher priority value than less important or less active categories of data. Greater numbers of paths in multipath data environments can be assigned a higher priority value than less numbers of paths. Newer times at which the data backup requests were received can be assigned a higher priority value than older times at which the data backup requests were received. Priority designations can be assigned a higher priority value than no priority designations. RAID levels having greater redundancy can be assigned a higher priority value than RAID levels having lesser redundancy.

Figure 4:
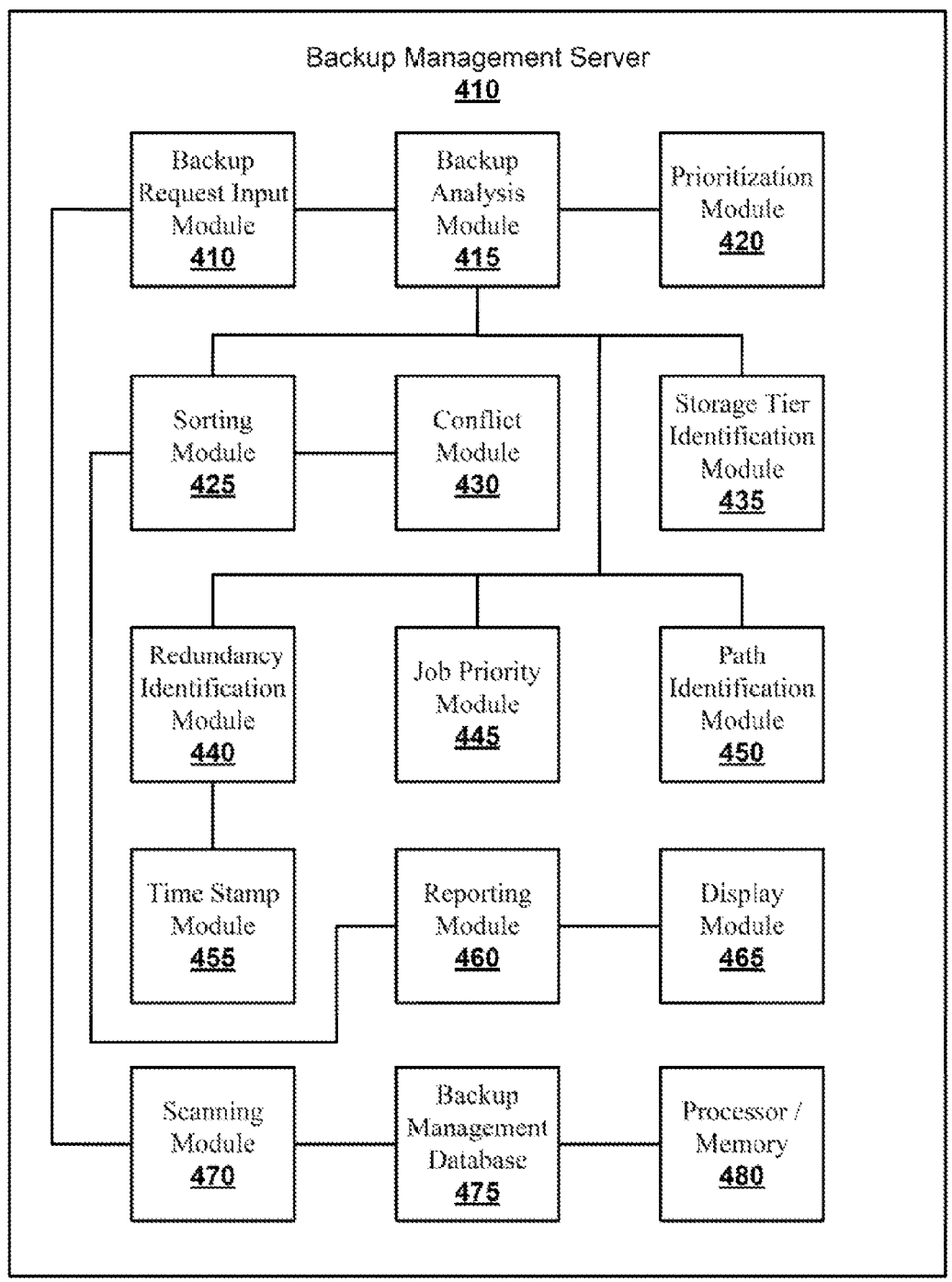
FIG. 4 is a block diagram of a system for prioritizing data backup requests in accordance with an example of the present technology.

Referring to FIG. 4, a system 400 for prioritizing date backup requests is illustrated in accordance with, an example. The system includes a backup request input module 410 for receiving and storing requests for data, backup. The backup request input module can be located on a backup management server 410 and may include client-side and server-side components for receiving backup request input from a backup manager and/or backup requestor. The system can include a backup analysis module 415 on the backup management, server and configured to receive backup requests from the backup request module. The backup analysis module can analyze the data backup requests to identify parameters associated with the data backup requests.

The system 400 cart include a prioritization module 420 on the backup management server. The prioritization module can assign priority values to the parameters associated with the data backup requests. A sorting module 425 can sort the data backup requests according to a primary parameter based on the priority values. The system can include a conflict module 430 to identify whether any of the data backup requests have a same priority value. The sorting module can further sort the data backup requests according to a secondary parameter when the conflict module identifies multiple data backup requests as having the same priority value.

The system can further include a storage tier identification module 435 for identifying a storage tier assignment for the plurality of data backup requests, a backup redundancy identification module 440 for identifying a backup redundancy for the plurality of data backup requests, a job priority module 445 for identifying user-assigned priorities for the plurality of data backup requests, a path identification module 450 for identifying a number of data paths associated with the plurality of data backup requests, and a time stamp module 455 for identifying a time of receipt of the plurality of data backup requests.

A reporting module 460 can report sorted data backup requests to a backup administrator. The reporting module can notify the administrator when a new backup request has been added which has not been sorted, or whether system conditions have changed that may warrant re-sorting. The reporting module can notify the administrator when, the administrator attempts to perform a backup job out of order and can enable the administrator to override the notification and perform the backup job anyway. The reporting module can report progress of backup jobs to the administrator or can provide summaries including various information such as the number of backup job requests, originators of the requests, request deadlines, and any other useful information. The reports can be available locally or over a network connection. Also, reports can be made to the administrator via any suitable or desirable method, including for example, email, text message, voice message, instant message, etc.

The reporting module 460 can also export any of the available reports to other applications or to formats usable by the other applications. For example, if backups are being performed using a different system, then the sorted backup jobs can be exported to a format usable by the different system in carrying out the backup jobs.

The system can include a display module 465 for graphically displaying the backup jobs, sorting options, parameter configuration options, report options, status indicators, and so forth. The system can include a scanning module 470 for scanning various system components to identify available storage tiers, path redundancy, backup redundancy, data redundancy, and so forth. The data, retrieved during the scan can be stored in a backup management database 475, which may be stored on a computer readable storage medium. The various modules can be in communication one with another and can further be electronically or optically coupled to processor and/or memory 480 for performing various tasks in one aspect, a system for prioritizing data backup requests can include a processor and a memory, the memory including program instructions that when executed by the processor function as the modules described above.

Figure 5:
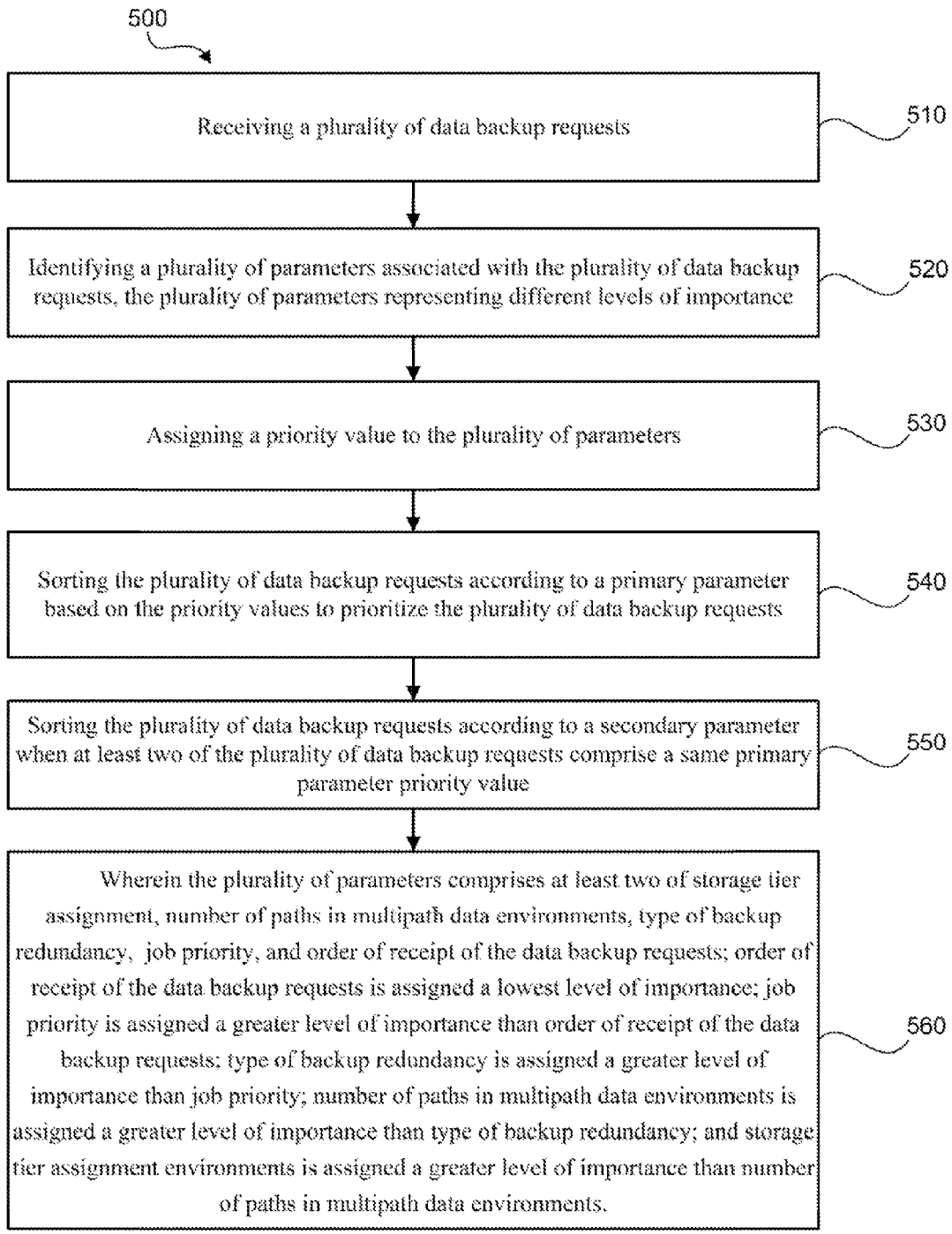
FIG. 5 is a flow diagram of a method for prioritizing data backup requests in accordance with an example of the present technology.

Another example method 500 for prioritizing data backup requests is shown in FIG. 5. The method includes receiving 510 data backup requests and identifying 520 parameters associated with the data, backup requests, which parameters can represent different levels of importance. The method can further include assigning 530 a priority value to the parameters, and sorting 540, 550 according to primary and secondary or subsequent parameters based on the priority values to prioritize the plurality of data backup requests and to resolve instances of multiple data backup requests having a same parameter priority value. In the method shown in FIG. 5, order of receipt of the data backup requests can be assigned a lowest level of importance, job priority can be assigned a greater level of importance than order of receipt of the data backup requests, type of backup redundancy can be assigned a greater level of importance than job priority, number of paths in multipath data environments can be assigned a greater level of importance than type of backup redundancy, and storage tier assignment can be assigned a greater level of importance than number of paths in multipath data environments.

Figure 6:
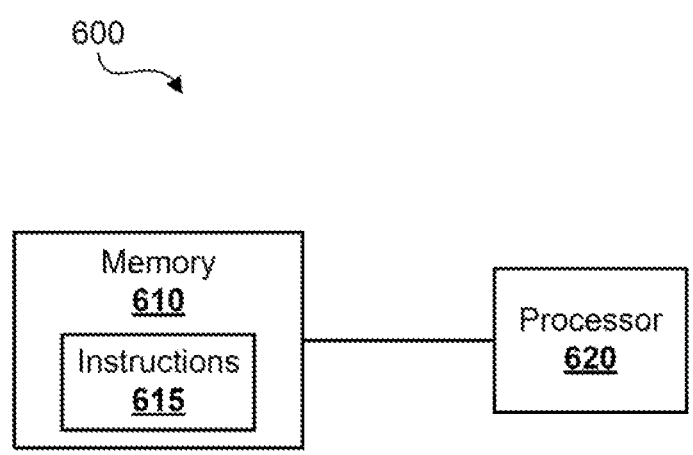
FIG. 6 is a block diagram of a system for prioritizing data backup requests in accordance with an example of the present technology.

Referring to FIG. 6, a system 600 and/or method can be implemented using a memory 610, processor 620, and/or computer readable medium. For example, an article of manufacture can include a memory or computer usable storage medium having computer readable program code or instructions 615 embodied therein for prioritizing data backup requests and comprising computer readable program code capable of performing the operations of the methods described. In another example, the memory can include portable memory containing installation files from which, software can be installed or remote memory from which installation filed can be downloaded. Also, program instructions stored in the memory can be embodied in installation files or installed files.

With the advent of modern computing, and particularly cloud-computing, data, backup can be an important consideration. Backup technology as described herein can enable backup administrators to provision backup jobs based on actual job priority, not just on a user-requested priority. The technology can also provide various reports, including backup job rankings, which can be sent to other backup applications such as HP DP and NetBackup.

The multi-criteria analysis described can aid in backup decision-making by organizing available information, incorporating business policies, and minimizing risk of data loss or improper sub-prioritization of important data backups. The policies or rules used in managing data backups can be open to analysis and explicit in application. The system can enable management and reconfiguration of policies or rules as desired.

As a result, backup administrators can effectively manage backup activities for datacenters. Because ranks for backup jobs can be benchmarked according to various parameters, backup administrators can determine which, backup jobs to be address first. Backup administrators need not rely on end users' expertise of system/application complexity/businesses criticality in decision-making. The technology can increase reliability of critical data by giving such data a high(est) priority when scheduling backups. The technology can also provide an effective utilization of network resources by identifying which jobs to address immediately instead of pushing ail/few backup jobs at once. The technology can also enable effective utilization of off-peak time for backup activities by performing backup for critical data first. The technology can be useful for managing/defining backup policies for existing datacenter setups.

The methods and systems of certain embodiments may be implemented in hardware, software, firmware, or combinations thereof. In one embodiment, the method can be executed by software or firmware that is stored in a memory and that is executed by a suitable instruction execution, system, if implemented in hardware, as in an alternative embodiment, the method can be implemented with any suitable technology that is well known in the art.

Also within, the scope of an embodiment is the implementation of a program or code that can be stored in a non-transitory machine-readable medium to permit a computer to perform any of the methods described above. For example, implementation can be embodied in any computer-readable media for use by or in connection, with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain program instruction and data for use by or in connection with the instruction execution system such as a processor. Computer readable media can comprise any one of many physical media such as, for example, electronic, magnetic, optical, electromagnetic, or semiconductor media. More specific examples of suitable computer-readable media include, but are not limited to, a magnetic computer diskette such as floppy diskettes or hard drives, a random access memory (RAM), a read-only memory (ROM), an erasable programmable read-only memory, or a portable device such as a compact disc (CD), thumb drive, or a digital video disc (DVD).

Various techniques, or certain aspects or portions thereof, may take the form of program code (i.e., instructions) embodied in tangible media, such as floppy diskettes, CD-ROMs. DVDs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Some of the functional units described in this specification have been labeled as modules, in order to more particularly emphasize their implementation independence. The various modules, engines, tools, or modules discussed herein may be, for example, software, firmware, commands, data files, programs, code, instructions, or the like, and may also include suitable mechanisms. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The modules can also be a combination of hardware and software. In an example configuration, the hardware can be a processor and memory while the software can be instructions stored in the memory.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

The invention claimed is:

1. A method for prioritizing data backup requests, comprising:
assigning priority values to a plurality of parameters, each parameter being associated with a plurality of data backup requests, the plurality of parameters comprising levels of importance and each of the plurality of parameters comprising a plurality of different potential values corresponding to the priority values, the plurality of parameters including at least two parameters selected from the group consisting of: storage tier assignment, number of paths in multipath data environments, type of backup redundancy, job priority, and order of receipt of the data backup requests, wherein assigning the priority values includes:
identifying the plurality of different potential values for order of receipt of the data backup requests as the times at which the data backup requests were received;
identifying the plurality of different potential values for job priority as at least designations of priority or no priority;
identifying the plurality of different potential values for type of backup as designations of RAID (Redundant Array of Independent Disks) levels;
identifying the plurality of different potential values for number of paths in multipath data environments as any values representing potential numbers of paths in the multipath data environments; and
identifying the plurality of different potential values for storage tier assignment as a plurality of tier designations for different categories of data;
sorting the plurality of data backup requests according to a primary parameter from the plurality of parameters based on the priority values to prioritize the plurality of data backup requests; and
sorting the plurality of data backup requests according to a secondary parameter from the plurality of parameters when at least two of the plurality of data backup requests comprise a same primary parameter priority value.

2. A method as in claim 1, further comprising:
sorting the plurality of data backup requests according to a tertiary parameter when at least two of the plurality of data backup requests comprise a same secondary parameter priority value;
sorting the plurality of data backup requests according to a quaternary parameter when at least two of the plurality of data backup requests comprise a same tertiary parameter priority value; and
sorting the plurality of data backup requests according to a quinary parameter when at least two of the plurality of data backup requests comprise a same quaternary parameter priority value.

3. A method as in claim 1, further comprising displaying the plurality of data backup requests on a display after sorting the plurality of data backup requests.

4. A method as in claim 1, further comprising:
assigning a lowest level of importance to order of receipt of the data backup requests;
assigning job priority a greater level of importance than order of receipt of the data backup requests;
assigning type of backup redundancy a greater level of importance than job priority;
assigning number of paths in multipath data environments a greater level of importance than type of backup redundancy; and
assigning storage tier assignment a greater level of importance than number of paths in multipath data environments.

5. A method as in claim 1, further comprising:
assigning more important or more active categories of data are a higher priority value than less important or less active categories of data, wherein the tier designations for different categories of data are based on importance or activity of the different categories of data;
assigning a higher priority value to greater numbers of paths in multipath data environments than lesser numbers of paths;
assigning a higher priority to newer times at which the data backup requests were received than older times at which the data backup requests were received;
assigning a higher priority value to priority designations than no priority designations; and
assigning a higher priority value to RAID levels having greater redundancy than RAID levels having lesser redundancy.

6. A non-transitory computer readable medium having program instructions for prioritizing data backup requests that when executed by the processor function as a backup request input module, a data analysis module, a prioritization module, a sorting module, and a conflict module, wherein:

the backup request input module is operable to receive and store requests for data backup;

the data analysis module is operable to analyze the data backup requests to identify a plurality of parameters associated with the data backup requests;

the prioritization module is operable to assign priority values to the plurality of parameters associated with the data backup requests, wherein the plurality of parameters comprises levels of importance and each of the plurality of parameters comprises a plurality of different potential values corresponding to the priority values, wherein the plurality of parameters includes at least two parameters selected from the group consisting of: storage tier assignment, number of paths in multipath data environments, type of backup redundancy, job priority, and order of receipt of the data backup requests, wherein the prioritization module is further operable to:

assign a lowest level of importance to order of receipt of the data backup requests;

assign job priority a greater level of importance than order of receipt of the data backup requests;

assign type of backup redundancy a greater level of importance than job priority;

assign number of paths in multipath data environments a greater level of importance than type of backup redundancy; and assign storage tier assignment a greater level of importance than number of paths in multipath data environments;

the sorting module is configured to sort the data backup requests according to a primary parameter from the plurality of parameters based on the priority values;

the conflict module is configured to identify whether a plurality of the data backup requests comprise a same priority value; and the sorting module is further configured to sort the data backup requests according to a secondary parameter from the plurality of parameters when the conflict module identifies the at least two data backup requests comprising the same priority value.

7. A non-transitory computer readable medium as in claim 6, wherein the memory further includes program instructions that when executed by the processor function as a storage tier identification module operable to identify a storage tier assignment for the plurality of data backup requests.

8. A non-transitory computer readable medium as in claim 6, wherein the memory further includes program instructions that when executed by the processor function as a backup redundancy identification module operable to identify backup redundancy for the plurality of data backup requests.

9. A non-transitory computer readable medium as in claim 6, wherein the memory further includes program instructions that when executed by the processor function as a job priority module operable to identify user-assigned priorities for the plurality of data backup requests.

10. A non-transitory computer readable medium as in claim 6, wherein the memory further includes program instructions that when executed by the processor function as a path identification module operable to identify a number of data paths associated with the plurality of data backup requests.

11. A non-transitory computer readable medium as in claim 6, wherein the memory further includes program instructions that when executed by the processor function as a time stamp module operable to identify a time of receipt of the plurality of data backup requests.

12. A system for prioritizing data backup requests comprising a processor and a memory, the memory including program instructions capable of performing the operations of:

receiving a plurality of data backup requests;

identifying a plurality of parameters associated with the plurality of data backup requests, the plurality of parameters representing different levels of importance, and wherein the plurality of parameters includes at least two parameters selected from the group consisting of: storage tier assignment, number of paths in multipath data environments, type of backup redundancy, job priority, and order of receipt of the data backup requests;

assigning a priority value to the plurality of parameters by assigning a lowest level of importance to order of receipt of the data backup requests, assigning job priority a greater level of importance than order of receipt of the data backup requests, assigning type of backup redundancy a greater level of importance than job priority, assigning number of paths in multipath data environments a greater level of importance than type of backup redundancy, and assigning storage tier assignment a greater level of importance than number of paths in multipath data environments;

sorting the plurality of data backup requests according to a primary parameter based on the priority values to prioritize the plurality of data backup requests; and sorting the plurality of data backup requests according to a secondary parameter when at least two of the plurality of data backup requests comprise a same primary parameter priority value.

13. A system as in claim 12, the memory including additional program instructions capable of performing further operations of:

sorting the plurality of data backup requests according to a tertiary parameter when at least two of the plurality of data backup requests comprise a same secondary parameter priority value;

sorting the plurality of data backup requests according to a quaternary parameter when at least two of the plurality of data backup requests comprise a same tertiary parameter priority value; and sorting the plurality of data backup requests according to a quinary parameter when at least two of the plurality of data backup requests comprise a same quaternary parameter priority value.

14. A system as in claim 12, the memory including additional program instructions capable of performing further operations of:

displaying the plurality of data backup requests on a display after sorting the plurality of data backup requests.

* * * * *